United States Patent

Priessnetz et al.

[15] 3,684,889

[45] Aug. 15, 1972

[54] OPTICAL SYSTEM FOR FACSIMILE SCANNERS AND THE LIKE

[72] Inventors: Edmund F. Priessnetz, Baldwin; Raymond Scott, Huntington, both of N.Y.

[73] Assignee: Electronic Transmission Systems, Inc., New York, N.Y.

[22] Filed: Feb. 11, 1970

[21] Appl. No.: 10,416

Related U.S. Application Data

[63] Continuation-in-part of Ser. No. 754,773, Aug. 23, 1968, abandoned.

[52] U.S. Cl...............250/216, 178/7.6, 250/219 FR, 250/239

[51] Int. Cl...............................................H01j 5/16

[58] Field of Search......178/7.6; 250/219 FR, 219 Q, 250/217, 211, 202, 203, 239, 220, 216; 35/35 A; 235/61.11 R

[56] References Cited

UNITED STATES PATENTS

| | | | |
|---|---|---|---|
| 2,420,716 | 5/1947 | Morton | 250/227 |
| 2,560,614 | 7/1951 | Walker | 178/7.1 |
| 2,975,387 | 3/1961 | Georgen | 250/211 X |
| 3,007,259 | 11/1961 | Abma | 35/35 A |
| 3,341,710 | 9/1967 | Cade | 250/239 |
| 2,325,941 | 8/1943 | Dickinson | 235/61.11 E |
| 2,565,266 | 8/1951 | Potts | 250/219 D |
| 2,797,334 | 6/1957 | Sweet | 250/239 |
| 2,866,279 | 12/1958 | Surber | 250/239 |
| 2,872,590 | 2/1959 | Leavens | 250/239 |
| 2,923,827 | 2/1960 | Dessauer | 250/239 |
| 3,053,181 | 9/1962 | Jorgenson | 250/219 F |
| 3,132,253 | 5/1964 | Sorsen | 250/202 |
| 3,167,612 | 1/1965 | Strickholm | 235/61.11 E |
| 3,415,433 | 12/1968 | Shaw | 250/219 F |

*Primary Examiner*—James W. Lawrence
*Assistant Examiner*—D. C. Nelms
*Attorney*—Allison C. Collard

[57] ABSTRACT

A simplified and effective optical system for facsimile scanners and the like wherein a plurality of prefocussed lamps illuminate the scanning spot and a coaxial lens system directs the reflected light through an aperture disposed in front of a photo-electric device for producing an electrical signal in response to changes in contrast of the scanning spot.

6 Claims, 6 Drawing Figures

INVENTORS
EDMUND F. PRIESSNETZ
RAYMOND SCOTT
BY Allison C. Collard
ATTORNEY

INVENTORS
EDMUND F. PRIESSNETZ
RAYMOND SCOTT
BY [signature]
ATTORNEY

OPTICAL SYSTEM FOR FACSIMILE SCANNERS AND THE LIKE

This application is a continuation-in-part of application Ser. No. 754,773, filed on Aug. 23, 1968 now abandoned.

This invention relates to a simplified and efficient optical system for facsimile scanners and the like for illuminating the scanning spot and producing an electrical signal responsive to the contrast of that spot.

More specifically, this invention relates to a simplified and efficient optical system for facsimile scanners wherein a plurality of prefocussed lamps are directed adjacent to and illuminate the scanning spot so that a coaxial lens system will direct the reflected light through a suitable aperture to an efficient photo-electric detector.

Conventional optical systems for facsimile scanners and the like have generally been complicated, physically massive, and relatively expensive. Generally, the light from a single high voltage lamp has been focussed on the scanning area by a relatively long focal length lens, and the reflected light has been picked up by similar lens system. Prior to the introduction of solid state circuitry, it was necessary for these high voltage lamps to produce a high intensity light directed on a scanning spot so that a photo-electric cell could receive a sufficient amount of light through a relatively long focal length lens in order to detect information on a scanning spot. The heat generated by the high intensity lamp, and the large focussing lens required, prevented attempts to package the optical system into smaller spaces.

Accordingly, the present invention provides a simple, inexpensive optical system for facsimile scanners which eliminates the need for any long focal length lenses since the system of the invention utilizes lamps having their own prefocussed lenses integrally formed on the end of the lamp. The lens is cast into the end of the bulb in the form of a very short focussed, high speed lens. The result is that a high intensity spot can be produced at a short distance without the aid of prisms, mirrors or other lenses. By directing a plurality of such prefocussed bulbs about an axis passing through the scanning spot, a high intensity illumination of the scanning spot area is possible. The reflected light from the scanning spot is then directed through a pair of short focal length, convex lenses which are mounted adjacent to each other within a lens column having its optical axis directed to the scanning spot. At the opposite end of the lens column, the reflected light is focussed into a small aperture which serves as a mask over the light sensitive surface of a photo-electric device. In one embodiment of the invention, the aperature is slightly offset from the optical center of the lens column so as to permit the photo-electric device to be initially adjusted by rotating it around the optical center to achieve improved resolution and focus. The preferred embodiment of the invention utilizes two prefocussed flashlight bulbs directed to the scanning spot and a sensitive CdS type photo cell for detecting the reflected image from the scanning spot. Because of the low heat dissipation of the lamps and their relatively small size, the entire optical system according to the present invention, has been significantly reduced in size with respect to conventional optical systems resulting in substantial savings in cost.

It is therefore an object according to the present invention to provide an optical system for facsimile scanners and the like utilizing a plurality of prefocussed lamps to illuminate the scanning spot.

It is another object according to the present invention to provide a simplified and efficient optical system for facsimile scanners and the like which has been significantly reduced in size over conventional optical systems.

It is still a further object according to the present invention to provide an optical system for facsimile scanners and the like which is simple in design, inexpensive in cost, and reliable in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views.

Figures 1, 2, 3:
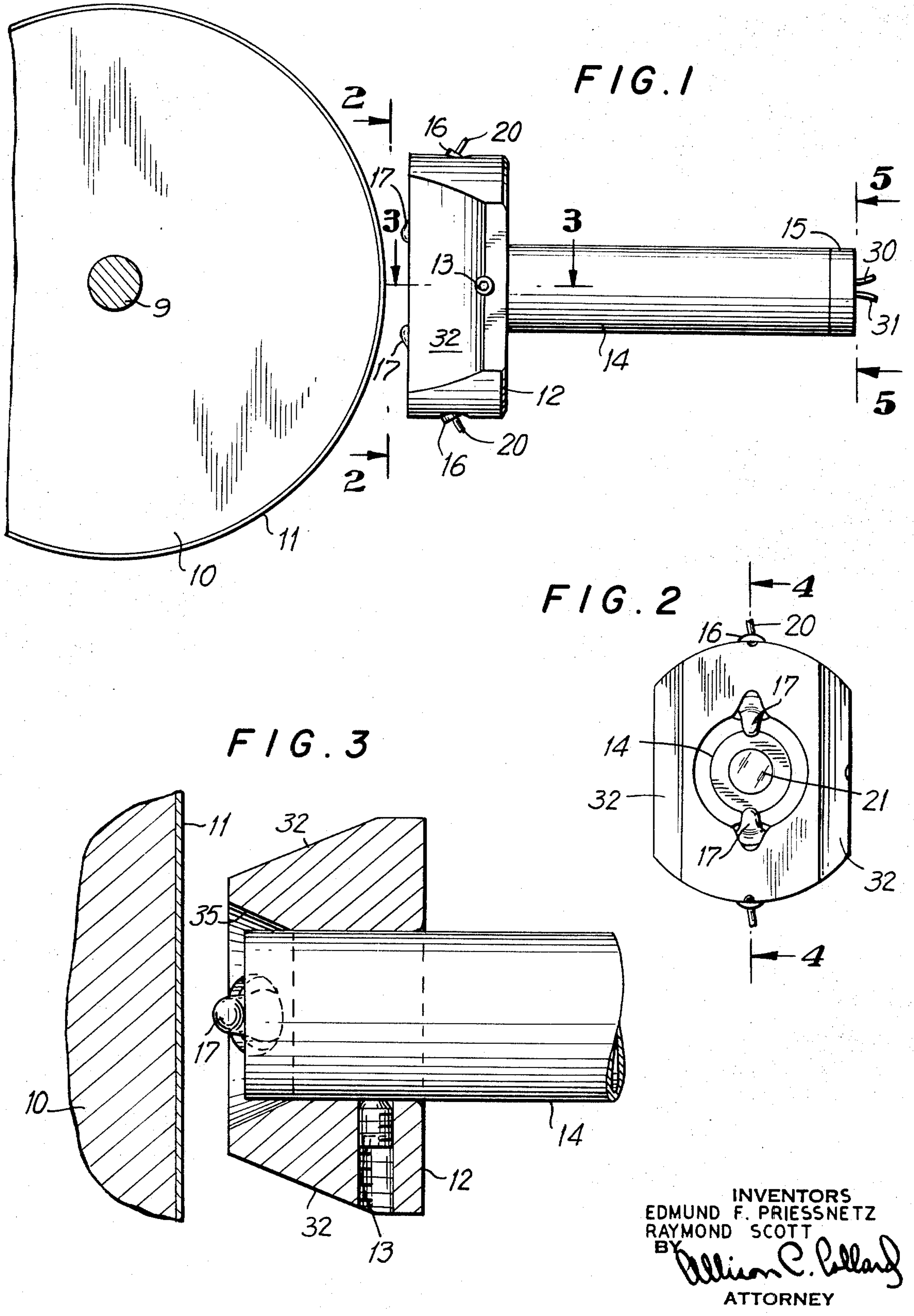
FIG. 1 is a side plan view of a simplified scanner showing the optical system according to the present invention.
FIG. 2 is a cross-sectional view taken along section 2—2 of FIG. 1.
FIG. 3 is a cross-sectional view taken along section 3—3 of FIG. 1.
Figure 4:
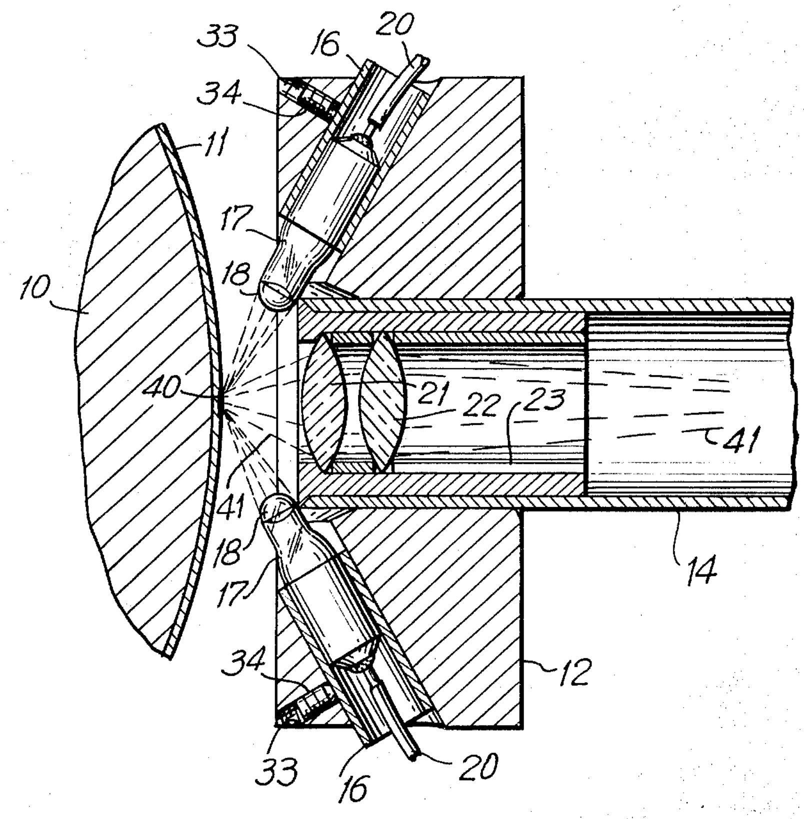
FIG. 4 is a cross-sectional view taken along section 4—4 of FIG. 2.
Figure 5:
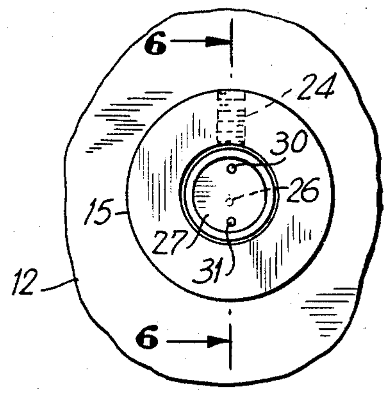
FIG. 5 is a cross-sectional view taken along section 5—5 of FIG. 1.
Figure 6:
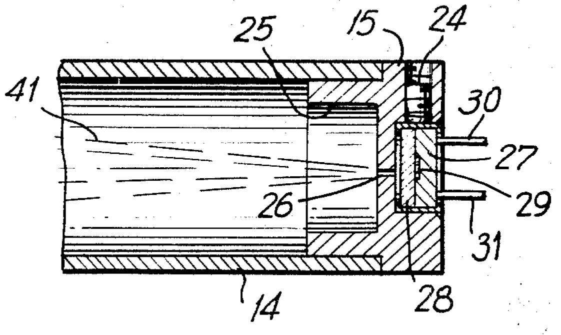
FIG. 6 is a cross-sectional view taken along section 6—6 of FIG. 5.

Referring to FIGS. 1–4, there is shown the inventive optical system for the scanner wherein the scanning drum 10 is pivotably mounted on axis 9 and includes a sheet of information 11 secured to the surface of drum 10 for rotational movement in front of the optical system. The optical system includes a modified cylindrical-shaped bezel 12 having a hollow tubular cylindrical column 14 disposed through the axis of bezel !12 terminating within its conical opening 35 facing information 11. Bezel 12 additionally includes set screw 13 disposed normal to the longitudinal axis of the bezel for frictionally engaging the outside surface of lens column 14, thereby permitting slidable adjustment of column 14 within the bezel. On at least two opposite sides of conically-shaped surface 35 are provided cylindrically-shaped passageways for accommodating tubular bushings 16 having their axes directed for convergence on a single spot on the surface of sheet 11, hereinafter referred to as scanning spot 40. Cylindrically-shaped bushings 16 are retained within bezel 12 by means of set screws 34 threadably coupled through holes 33 in the body of bezel 12, and in engagement with the outer surface of bushings 16. Frictionally retained within each of bushings 16 is a lamp 17 having a prefocussed lens 18 integrally cast on the end portions of its glass envelope. Electrical energy supplied to bushings 16, and through conductors 20 connected to the other terminals of the lamps will illuminate the filaments of the lamps. After the lamps are turned on, set screws 34 may be loosened to permit sleeves 16 and lamps 17 retained therein to be properly positioned so that the light passing through lenses 18 will be focussed on scanning spot 40. The reflected light 41 from scanning spot 40 will pass through converging lenses 20 and 21 which are mounted in cylindrical sleeve 23 held adjacent to the end of column 14. Lenses 21 and 22 are short focal length lenses so that the presence of lens 22 mounted almost immediately behind lens 21 causes the reflected light rays 41 to diverge slightly and focus adjacent to aperture 26 formed in cap 15 which is secured on the end of column 14 as shown in FIGS. 5 and 6. End cap 15 includes a cylindrical flange 25 having a reduced diameter with respect to the internal diameter of tubular column 14 so that it will frictionally fit on the end of column 14. Behind aperture 26 is a photo-electric device consisting of a selenium type photo cell having a protective transparent lens 28 and a rectangularly-shaped photo sensitive area 29 disposed behind lens 28 within its body 27. A pair of electrical terminals 30 and 31 produce an output signal proportional to the illumination of sensitive area 29. A set screw 24 threadably engaged to cap 15 retains photo cell 27 from any movement within cap 15.

In an actual embodiment of the optical system of the invention, lamps 17 are type 253 X of Chicago Miniature Lamp Company, having a voltage of 2.5 volts and a rated life of 10,000 hours of operation. Photo cell 27 is a Clairex type CL 707 H, CdS photoconductive cell. Lenses 21 and 22 are Jaeger type, three-element convex lenses having a focal length of 25 mm., a diameter of 12 mm, and f 0.9 speed. The center of lens 21 is mounted approximately 0.5 inch from scanning spot 40, and the front face of lens 22 is mounted approximately 0.001–0.002 inch from the back face of lens 21 along a common optical axis. Aperture 26 is approximately 3.5 inches from the back face of lens 22, and offset 0.015 inch from the optical axis of the lens column. The diameter of aperture 26 is approximately 0.026 inch.

Bezel 12 and bushings 16 are preferably constructed from conductive material such as metal to accommodate electrical illumination of lamps 17. Bezel 12 is also provided with a black, non-reflective finish to prevent undesirable reflections from the scanning spot from affecting the response of cell 27.

In setting up the optical system of the present invention, it is recommended that various adjustments be made to the various components of the system prior to its operation. Lamps 17 may be rotated within bushings 16 in order that the filaments of the lamp be disposed parallel upon one another when striking the scanning spot 40. The holes in which bushings 16 are disposed may be made slightly eccentric so that the bushings, containing lamps 17, can be rotated in order to further improve the alignment of the illumination upon scanning spot 40. Moreover, bushings 16 containing lamps 17 may be advanced inward or retarded outwardly with respect to scanning spot 40 to further focus the light onto the image.

Bezel 12 which contains the lamp assembly may also be advanced or withdrawn from the scanning spot in order to effect the proper alignment of the illumination. Bezel 12 may also be rotated about the optical axis, if required.

Cylindrical column 14 which contains lenses 21 and 22, may be linearly advanced or retarded within bezel 12, rotated about the optical axis in order to accomplish the focusing of the reflected image from scanning spot 40 through the lenses to aperture 46, which is slightly offset from the optical axis. Moreover, cylindrical cap 15 may also be rotated with respect to lens column 14 to permit further adjustment of aperture 26 with respect to the reflected image. Photocell 27 which contains the rectangularly shaped photosensitive area 29 may also be pivoted with respect to cap 15 in order to improve the sensitivity of detection of the reflected image.

The optical system of the subject invention, having all of the above described adjustments available within its construction, has been found to provide a superior facsimile reproduction having at least 10 distinct shades of grey on the reproduced copy. Moreover, due to the improved sensitivity of the optical system of the invention, it has been found that material containing data having all colors can be faithfully reproduced without loss of intensity or image.

While only a few embodiments of the present invention have been shown and described, it will be understood that many changes and modifications may be made thereunto without departing from the spirit and scope of the invention.

What is claimed is:

1. An optical system for scanning information, comprising:

a mounting bezel, a lens column, mounted on said bezel and disposed concentric with the axis thereof, and having an aperture provided in one end;

at least two pre-focused illumination lamps, each having a lens integrally formed on its end, for focusing converging illumination on a scanning spot on the information;

a pair of convex lenses, having their axes directed at the information being scanned, and disposed coaxially adjacent one another within said lens column, so that the focal point of said lenses is disposed adjacent said aperture in said lens column, for focusing light reflected from the scanning spot on the information in said aperture; and a photoconductive cell, disposed behind said aperture in said lens column, responsive to light focused in said aperture by said convex lenses for producing an electrical signal in response to changes in the reflected light corresponding to changes in the scanned information, and wherein said illumination lamps are slidably disposed within said bezel on opposite sides of said lens column, and are directed toward the information being scanned; and wherein said lens column is slidably disposed within said bezel so that the distance between said lens column and the information being scanned is adjustable by sliding said lens column in said bezel.

2. The optical system as recited in claim 1, further comprising a cap, slidably and rotatably disposed in the end of said lens column furthest from the information being scanned, said aperture being disposed in said cap offset from the optical axis of said lens column.

3. The optical system as recited in claim 2, wherein said convex lenses are three-element convex lenses.

4. The optical system as recited in claim 2, wherein said photoconductive cell is a CdS photocell.

5. The optical system as recited in claim 2, wherein said bezel further comprises a pair of cylindrical bores for slidably receiving said illumination lamps, and means for adjustable securing said lamps within said bores.

6. The optical system as recited in claim 2, wherein said cap further comprises a mounting recess disposed behind said aperture for receiving said photoconductive cell, and means for adjustable securing said photoconductive cell within said cap.

* * * * *